United States Patent [19]

Malik et al.

[11] Patent Number: 4,659,605

[45] Date of Patent: Apr. 21, 1987

[54] ELECTROLESS DEPOSITION MAGNETIC RECORDING MEDIA PROCESS AND PRODUCTS PRODUCED THEREBY

[75] Inventors: Michael Malik, Livonia; Joseph L. Greene, Highland, both of Mich.

[73] Assignee: Richardson Chemical Company, Des Plaines, Ill.

[21] Appl. No.: 610,684

[22] Filed: May 16, 1984

[51] Int. Cl.$^4$ .............................................. H01F 10/02
[52] U.S. Cl. .................................... 427/129; 427/131; 427/132
[58] Field of Search ................................ 427/127–132, 427/438

[56] References Cited

U.S. PATENT DOCUMENTS 3,531,322  9/1970  Kefalas et al. ..................... 117/236
4,128,691  12/1978  Shirahata et al. ................... 428/336

Primary Examiner—Bernard D. Pianalto
Attorney, Agent, or Firm—Lockwood, Alex, Fitzgibbon & Cummings

[57] ABSTRACT

A process for producing a high density magnetic storage device such as a rigid memory disc having improved magnetic recording properties including high coercivity, high remanence and improved hysteresis loop squareness. The device is prepared by initially cleaning the surface of a substrate, such as an aluminum disc, zincating that cleaned surface, when applicable electrolessly depositing a non-magnetic, nickel-phosphorus layer thereon which is substantially free of pits and other surface imperfections and which has a nickel content of from approximately 88 to 92 percent and a phosphorus content of from 12 to 8 percent, by weight. The non-magnetic, nickel-phosphorus layer is then polished and a magnetic, cobalt-phosphorus layer electrolessly deposited thereon. The cobalt-phosphorus deposition is performed in a highly stable, ammonia-free bath containing a source of cobalt ions, a source of hypophosphite ions, a source of citrate ions, and a low molecular weight, bath soluble amino acid. Preferably, a buffering agent such as, for example, a borate is employed in the bath. Thereafter, if desired, a protective coating in the form of a fluorocarbon, graphite or an electroless nickel-boron layer may be applied as an overlayer to the cobalt-phosphorus layer.

49 Claims, No Drawings

ELECTROLESS DEPOSITION MAGNETIC RECORDING MEDIA PROCESS AND PRODUCTS PRODUCED THEREBY

BACKGROUND AND DESCRIPTION OF THE INVENTION

The present invention generally relates to a process of producing magnetic recording media and to products produced thereby. More particularly, this invention is directed to the electroless deposition of cobalt-phosphorus films having improved magnetic recording properties including high coercivity, improved hysteresis loop squareness and high remanence values. In this regard, an important aspect of the present invention concerns a process for the electroless deposition of a magnetic cobalt-phosphorus film onto a non-magnetic nickel-phosphorus film in the production of improved rigid memory discs which are especially suited for use in computer applications.

Magnetic recording impulse memory devices are extensively used in computer and data processing systems. These devices generally include a substrate on which a thin film of magnetic material has been deposited. While the present invention has application to the deposition of magnetic recording media on a variety of carriers, it has particularly advantageous application to the manufacture of rigid memory discs having large storage capacities.

The requirements of the magnetic recording media of these discs are critical since the reading and writing of information data on the surfaces thereof are usually performed by magnetic transducers which are supported in flying heads positioned in closely spaced relation to the surfaces of the discs. In the writing phase of the operation, the magnetic transducer converts current impulses into a bidirectional magnetic field which then locally changes the direction of the magnetic flux in the film of the cobalt-phosphorus magnetic film. Correspondingly, in the reading phase of the operation, the flux reversals in the magnetic media are converted by the transducer into an electrical voltage output pattern.

Rigid memory discs have, in the past, commonly been manufactured by initially cleaning the surface of an aluminum disc to render it receptive to a non-magnetic coating, electrolessly depositing a non-magnetic nickel-containing layer thereon, cleaning and activating that non-magnetic layer to make it receptive to a magnetic layer, and then depositing a magnetic electroless cobalt-containing layer in an ammonia-containing bath. Thereafter, the disc was cleaned and a lubricant or other protective coating applied over the magnetic layer.

These prior art procedures often involved the deposition of magnetic films at thicknesses which were greater than five or even ten micro-inches in order to obtain higher output voltages from the magnetic media. It has been found, however, that greatly improved performance is obtainable with much thinner magnetic films. For example, packing densities in the order of 25,000 bits per inch are obtainable with magnetic films of less than five micro-inches. The reduced thickness of these films, however, reduces the output from the magnetic medium. As a result, these thin magnetic films must possess exceptional magnetic properties including magnetic coercivity values in the range of from 300 to 1000 oersteds, or more, remanent magnetization in the range of 6000 to 10,000 gauss and improved hysteresis loop squareness characteristics, that is hysteresis loops wherein the sides are substantially vertical. Additionally, since these magnetic films were commonly produced from baths which utilized ammonia as a pH adjustor and bath-stabilizer, the baths themselves were characterized by pH regulation difficulties, bath instability and the need for constant replenishment of ammonia in the bath. Furthermore, these ammonia-stabilized baths produced noxious fumes which required venting.

In accordance with the present invention, an improved process is provided for producing a high density magnetic storage device having enhanced magnetic recording properties including high coercivity, improved hysteresis loop squareness and high remanence values. High density magnetic storage devices made in accordance with this invention are processed by the cooperative association of an electroless, non-magnetic nickel-phosphorus deposition step wherein the nickel-phosphorus layer is substantially free of pits and other surface imperfections, followed by a cobalt-phosphorus deposition step wherein the cobalt-phosphorus deposition is performed in an electroless plating bath containing a source of cobalt ions, a source of hypophosphite ions, a source of citrate ions, and a low molecular weight, bath soluble amino acid. Preferably, a buffering agent such as, for example, sodium or potassium tetraborate is present in the electroless cobalt-phosphorus plating bath.

It is, therefore, a general object of the present invention to provide a new and improved process for producing cobalt-phosphorus magnetic recording media.

Another object of the present invention is to provide an improved method for electrolessly plating a magnetic cobalt-phosphorus layer onto a non-magnetic nickel-phosphorus layer to provide a recording device which is characterized by improved magnetic recording properties including high coercivity, improved hysteresis loop squareness and high remanence values.

Another object of the present invention is to provide an improved non-ammoniated, cobalt-phosphorus deposition procedure which is uniquely suited to be conjointly employed with a particular electroless nickel-phosphorus deposition procedure to provide improved magnetic recording media.

Another object of the present invention is to provide an improved magnetic recording media having a non-magnetic electroless nickel-phosphorus layer over which a magnetic cobalt-phosphorus layer has been electrolessly deposited, which magnetic recording media is characterized by coercivities substantially in excess of 300 oersteds, substantially improved hysteresis loop squareness and high remanence values.

Another object of the present invention is to provide a bath formulation of a variety of coercivities from 300 to 1000 oersteds or higher by adjusting only the operating parameters such as temperatures, time and pH.

These and other objects of the present invention will be apparent from the following description of a preferred embodiment thereof.

In general, the chemical deposition or electroless plating aspects of the present invention are particulary suited for depositing a non-magnetic nickel-phosphorus alloy onto a suitable substrate such as, for example, an aluminum disc, or a disc or tape composed of a suitable plastic such as, for example "Mylar" brand plastic, a poly (ethylene terephthalate). The nickel-phosphorus deposition step is followed by the subsequent addition of a magnetic cobalt-phosphorus layer onto the non-magnetic layer by electroless deposition procedures which do not require the use of ammonia or ammoniated compounds as a bath stabilizing agent. While these procedures are especially useful in the preparation of rigid memory discs, the preparation of which will be described in detail, it will be appreciated that the principals of this invention have application to a variety of magnetic recording media including, the deposition of magnetic recording media on tapes, belts, drums and other substrate surfaces.

An important aspect of this invention concerns the unique cooperation between the magnetic, electrolessly deposited cobalt-phosphorus layer and the electroless nickel-phosphorus layer which is non-magnetic as-deposited and remains non-magnetic, even when exposed to elevated temperatures. This electroless-nickel underlayer is further characterized by an unusually smooth surface which is free of imperfections such as nodules and pits. This feature of the present invention is particularly important since irregularities in the surface of a rigid disc of any kind in excess of one-millionth of an inch can cause head crash or defective recording.

The electrolessly deposited cobalt-phosphorus magnetic layer cooperates with the non-magnetic, nickel-phosphorus layer to provide a high quality recording medium which is characterized by high coercivity in the range of from 300 to 1000 or more oersteds, hysteresis loop squareness in the range of 88 to 95 percent or more, and high magnetic remanence, on the order of 10,000 gauss.

The manufacture of rigid memory discs in accordance with this invention generally involves a sequential series of manufacturing operations including machining of an aluminum disc surface, cleaning of that surface to remove oils and oxides therefrom, zincating the cleaned aluminum substrate surface when applicable, applying a particular non-magnetic, nickel-phosphorus plating thereon, preferably polishing and/or texturizing of the nickel-phosphorus layer, further cleaning and activating that surface, electrolessly depositing a magnetic cobalt-phosphorus layer thereto, followed by cleaning of that cobalt-phosphorus surface and, optionally, the application of a lubricant or protective coating thereon. Each of these sequential steps will be described in greater detail below.

A suitable aluminum substrate disc for example one composed of 5086 aluminum alloy, is initially machined smooth, degreased with an organic solvent, cleaned with a non-etching aluminum cleaner and thoroughly rinsed with distilled or deionized water. Typically, the disc cleaning will be conducted by immersing the aluminum disc in a non-silicated, non-etch liquid alkaline cleaner for a period of two to three minutes at a temperature of from 140° to 160° F. Rinsing of the treated disc is usually done by spraying the disc with distilled or deionized water for approximately thirty seconds or more. The alkaline cleaning and rinsing step can be followed by treating the thus processed disc in a non-etching, acid soak cleaner to assure that the aluminum surface is oxide free and to maximize the adhesion of the electroless-nickel coating, thereby optimizing that coating's corrosion protection. Typically, the acid cleaning operation is conducted at a temperature of from 150° to 170° F. with an immersion time of from two to six minutes and with mild agitation. Following the acid cleaning step, one or two rinses with distilled or deionized water is recommended.

After these cleaning and substrate preparation steps, the aluminum disc is then preferably subjected to a zincating process to form a thin zinc layer thereon. Suitable zincating processes will be apparent to those skilled in the art and generally involve zincating of the aluminum by immersing of the prepared substrate in a suitable zincate bath for a period of approximately thirty seconds to produce a uniform, thin (i.e. approximately 1.5 micro-inch), dense, fine-grained zinc deposit with a minimum of etching of the aluminum surface. This zincating process assures maximum adhesion of the non-magentic electroless nickel-phosphorus.

Following the initial zincating step, if desired, the zinc coated substrate is rinsed with either distilled or deionized water and then subjected to a zinc stripping operation by immersion of the disc in a suitable acid such as, for example, nitric acid, followed by a further rinsing with distilled or deionized water and then subjected to a further zincating step by immersion of the disc in a suitable alkaline zincate bath which is typically maintained at a temperature of from approximately 70° to 90°F. for a period of from approximately ten to thirty seconds, preferably with mild agitation to produce a zinc layer of from 0.25 to about 0.75 micro-inch thereon.

The zinc coated substrate is then subjected to a further rinse with distilled or deionized water followed by an optional neutralization step to remove any residual caustic from the previous zincating step. A suitable neutralization procedure involves immersing the thus processed disc in a solution containing thirty grams per liter of sodium bicarbonate, maintained at room temperature, for approximately thirty seconds. This neutralization step is then followed by a further rinse with distilled or deionized water.

The zinc coated aluminum substrate disc is now ready for electroless deposition of the non-magnetic, nickel-phosphorus layer. In this regard, it is important that the non-magnetic electroless nickel-phosphorus deposit which is applied to the disc be free of all surface imperfections.

In accordance with an important aspect of this invention, the zinc coated aluminum substrate surface is immersed in an electroless bath containing a source of nickel ions, a source of hypophosphite ions, a suitable buffering agent such as, for example, carboxylic acids, boric acid or a bath-soluble borate, and an ester complex of glucoheptonic acid. Suitable ester complexes of glucoheptonic acid which can be utilized in this electroless plating step include the ester complexes of glucoheptonic acid which are selected from the group consisting of the diboron, tungsten and molybdenum esters of glucoheptonic acid. These ester complexes can be broadly characterized as ester complexes of polyhydric compounds which are formed by reacting an oxyacid with a polyhydric acid or alcohol. The polyhydric acids or alcohols which may be employed for these purposes are preferably carboxylic acids or alcohols which contain at least two hydroxy groups and from about four to about fifteen carbon atoms per molecule. Typical polyhydric compounds include acids such as tartaric, gluconic or glucoheptonic or alcohols such as mannitol, 2,3-butanediol or 1,2,3-propanetriol. Of these various polyhydric compounds, however, the carboxylic acids are generally preferred and a particularly suitable polyhydric acid is glucoheptonic acid.

The oxyacids which may be reacted with the polyhydric compounds to form the ester complex are generally inorganic acids of such metals and non-metals as boron, tungsten and molybdenum, which form oxyacids such as boric, tungstic and molydbic acids. Of the various oxyacids, however, which may be employed, the tungstic, molybdic and boric acids are particularly preferred especially when they are esterified with the preferred polyhydric acids such as glucoheptonic acid to form highly preferred and suitable ester complexes such as the boron, molybdenum or tungsten esters of glucoheptonic acid.

The ester complexes may also and in certain instances preferably are in the form of a polyester, that is an ester complex formed by reacting two or more moles of the oxyacid with one mole of the polyhydric compound. A typical example of such polyester and also illustrative of a particularly preferred ester complex is the diboron ester of glucoheptonic acid formed by reacting two moles of boric acid with one mole of glucoheptonic acid.

Nickel phosphorus electroless plating baths of the foregoing type are particularly suited for use in the present invention since they provide a non magnetic, nickel-phosphorus deposit having a phosphorus content of from 8 to 12 percent and a corresponding nickel concentration of from 92 to 88 percent. Furthermore, these baths are typically operated at a pH of from approximately 4.1 to 4.8 with the bath preferably being maintained at a pH of approximately 4.7 to provide a high plating rate of deposition rate while still providing a electroless nickel-phosphorus deposit which is non-magnetic as deposited and which does not become magnetic with age.

Another suitable non-magnetic, nickel-phosphorus electroless deposit can be obtained by conducting the electroless nickel-phosphorus deposition in a bath which includes an unsaturated carboxylic acid of the formula $R(COOH)_n$ or a bath soluble derivative thereof, wherein R is an unsaturated alkyl chain having at least two carbon atoms and wherein n is at least 1, a source of hypophosphite ions, and a source of nickel. Suitable unsaturated carboxylic acids include aconitic acid, citraconic acid, itaconic acid, and maleic acid as well as other acids falling within this general classification and having properties and characteristics similiar thereto. Additionally, a buffering agent is preferably included in these alternate electroless nickel-phosphorus baths. In this regard, while traditional monocarboxylic acid derived buffering systems may be used, such as, for example, acetic acid-sodium acetate systems, boric acid-borate systems, and propionic acid-propionate systems, maximum efficiency of these alternate nickel-phosphorus baths especially in connection with the enhancement of phosphorus deposition percentages without adversely affecting the plating rate, is attained when the buffer is a saturated alkyl or aromatic polycarboxylic acid and/or bath soluble derivitive thereof. Typically, these alternate nickel baths are operated at a temperature of between 160° and 212°F. (about 71° to 100°C.) In this manner, nickel-phosphorus deposits will be formed having a nickel concentration of approximately 90 percent and a phosphorus content of approximately 10 percent. Preferably, these baths are operated at a pH of at least about 4.1, and usually on the order of 4.5 to 4.8, thereby providing a high plating rate as well as the aforementioned, desired non-magnetic characteristics.

The utilization of either of the foregoing nickel-phosphorus plating baths is usually done by immersing the zinc coated aluminum disc in the bath for a period of time sufficient to permit a deposit having a thickness of from approximately 0.7 to 1 mil (approximately 17.8 to 25.4 micro-meters). The thus plated disc is then subjected to a polishing and/or texturizing step wherein the nickel-phosphorus layer is reduced to a thickness of from approximately 0.2 to 0.5 mil (approximately 7.6 to 12.2 micro-meters). In this regard, it will be appreciated that, the thickness of the electroless nickel-phosphorus layer, as deposited, can be varied so long as such variation is compensated by either more or less polishing so as to produce a resultant electroless nickel undercoat having the desired thickness of from 0.1 to 1.0 mil.

Following the polishing step, the nickel-phosphorus plated disc is rinsed in distilled or deionized water for approximately thirty seconds and then subjected to a cleaning, usually with either a mild acid or alkaline solution. Suitable acids for this purpose include phosphoric and citric acids which typically will be used in conjunction with known organic wetters. This cleaning step, however, can be eliminated in those instances wherein the disc, after polishing, is virtually free of contaminents.

Activation of the electroless nickel-phosphorus layer for the subsequent electroless nickel-cobalt deposition is typically achieved by the use of an acid dip. For example, the nickel-phosphorus layer can be immersed in a bath containing a 20 percent solution of hydrochloric acid, rinsed with distilled or deionized water, then further treated with a 5 percent sulfuric acid solution to remove any residual chloride present on the disc, followed by a further rinse with distilled or deionized water. Additional activating agents may consist of such solutions as 10 percent sulfuric acid containing potassium iodide or 10 grams per liter sulfamic acid containing 1 percent hydrogen peroxide, or nitric acid mixtures containing additives such as chlorides, fluorides, or phosphates.

In accordance with an important aspect to the present invention, the nickel-phosphorus plated substrate is then processed in an electroless cobalt-phosphorus plating bath which is prepared from suitable sources of cobalt ions, hypophosphite ions, and citrate ions, and a low molecular weight, bath soluble amino acid. A buffering agent such as, for example, boric acid or an alkaline metal tetraborate, metaborate or pentaborate is also preferably included. Additionally, if desired, a suitable wetting agent such as, for example, an ethanolamine may be incorporated in the bath.

The source of cobalt cations for these cobalt baths can be any water soluble or semi-soluble salts of cobalt which supply divalent cobalt cations in the bath. Illustrative examples of suitable cobalt sources include cobalt sulfate heptahydrate, cobalt chloride and cobalt citrate. Cobalt concentrations utilized in these baths will generally range from about 0.01 mole per liter of bath to about 0.1 mole per liter. In instances wherein cobalt sulfate heptahydrate is used as the cobalt source, a concentration of this cobalt salt of from approximately 5 to 15 grams per liter will generally provide satisfactory results with the concentration of from 6 to 10 grams per liter being particularly preferred.

The hypophosphite reducing agents utilized in these cobalt-phosphorus depositing baths include any bath soluble hypophosphite sources such as sodium or potassium hypophosphite. Correspondingly, if desired, hypophosphorus acid or other suitable sources of hypophosphite may be utilized. A typical minimum concentration for the reducing agent can be as low as 0.04 mole per liter of bath, more usually, however, higher concentrations in the order of from 0.05 to about 0.2 mole per liter will be employed with approximately 0.1 mole per liter being preferred for most operations. In instances wherein sodium hypophosphite is used, bath concentrations thereof of from approximately 5 to 30 grams per liter are generally satisfactory with a concentration of approximately 8.0 to 12.0 grams per liter being preferred.

These cobalt-phosphorus plating baths in accordance with an important aspect of this invention, also contain a complexor constituent which includes a suitable source of citrate ions and a low molecular weight, bath soluble amino acid, and a buffering agent, preferably a borate.

Suitable sources of citrate ions include citric acid as well as the sodium and the potassium salts thereof, with sodium citrate dihydrate being a particularly suitable complexor for use in conjunction with the forementioned low molecular weight, bath soluble amino acids. In general, the minimum concentration for the citrate ions will be approximately three times the molar concentration of the cobalt source. While higher concentrations of citrate ions can be tolerated, increasing the concentration thereof does not appear to provide any particularly beneficial results. In instances wherein sodium citrate dihydrate is used, bath concentrations thereof of from approximately 20 to 100 grams per liter are generally satisfactory with a concentration of approximately 30 to 90 grams per liter being a preferred.

The low molecular weight, bath soluble amino acids which are contemplated by the present invention are those which typically include from two to five carbon atoms, with the alpha amino acid forms thereof being particularly preferred. Illustrative examples of these low molecular weight, bath soluble amino acids include alpha-alanine, glycine, monosodium glutamate, serine, threonine and valine. In general, bath concentrations of these amino acids will range from approximately 0.1 mole to approximately 1.0 mole with approximately 0.2 to 0.4 moles per liter being preferred for most operations. In instances wherein glycine is utilized, bath concentrations thereof of from 10 to 35 grams per liter are generally satisfactory with concentrations of approximately 15 to 30 grams per liter being preferred.

As previously noted, the cobalt-phosphorus plating baths of this invention can also advantageously include a buffering agent, preferably a borate such as, for example, an alkaline metal tetraborate, metaborate or pentaborate, with sodium tetraborate decahydrate being preferred. In general, the concentration of the buffering agent is that amount which is effective to achieve the desired pH control and will typically range from approximately 0.01 to 0.1 moles per liter. In instances wherein sodium tetraborate decahydrate is used, bath concentrations thereof of from 10 to 35 grams per liter can be utilized with concentrations of from approximately 15 to 30 grams being generally preferred.

As desired, an ethanolamine such as mono-,di-, or triethanolamine, or a mixture of such ethanolamines in an amount of approximately 2.0 to 10 grams per liter may be added to the bath. The ethanolamines, while not essential, advantageously function as wetting agents and complexors in conjunction with the other bath ingredients.

The cobalt-phosphorus plating baths are typically maintained at a pH of from approximately 8 to 10.5 with a pH range of from approximately 9.4 to 10.0 being preferred and a pH of 9.8 being particularly preferred. Correspondingly, bath temperatures of from approximately 160° to 185° F. (71° to 84° C.) can be utilized with bath temperatures with approximately 176° F. (80° C.) being preferred. In this regard, however, it will be appreciated that temperatures below and above these ranges can be effectively utilized depending upon the other conditions of the bath. In general, a cobalt-phosphorus layer of from 1 to 5 micro-inches will provide a magnetic cobalt-phosphorus deposit exhibiting the desired magnetic recording properties which are attainable with this invention.

Following the cobalt-phosphorus deposition step, the rigid disc is then dried. Any suitable means which avoid tarnishing or otherwise damaging the plated cobalt-phosphorus layer can be utilized for this purpose. Thereafter, a protective coating can be applied. Suitable protective coatings include the fluorocarbons, usually applied with a freon solvent, electrolessly deposited nickel-boron deposits of the type described in U.S. Pat. No. 4,407,869 and graphite which can be applied by a variety of procedures including, for example, sputtering techniques. These protective overcoats act to prevent oxidation of the cobalt-phosphorus layer and further function as a protective barrier to the "read" and "write" heads by preventing direct contact with contaminants that may enter the system when the disc is in use.

The following examples are set forth below to illustrate the cobalt-phosphorus baths which are utilized in the practice of the present invention:

EXAMPLE I A 5086 aluminum alloy disc with a diameter of 3.9 inches and a thickness of 0.068 inch was first cleaned and degreased in a bath containing a non-etch alkaline solution with mild agitation and maintained at a temperature of approximately 160° F. (71° C.) for three minutes. The disc was then rinsed by spraying it with deionized water for thirty seconds and dipping it in a non-etching acid at a temperature of about 160° F. (71° C.), with an immersion time of four minutes and with mild agitation. The thus treated disc was then subjected to a further rinse with deionized water and zincated with a commercially available zincating solution at a temperature of 80° F. (26° C.) for forty seconds, with mild agitation. The thus zincated disc was then rinsed with the deionized water and the zinc layer thereon stripped by immersing the disc in a 60 percent nitric acid solution and rinsed with deionized water. The disc was again immersed in a zincating solution at a temperature of approximately 80° F. (26° C.) with mild agitation for twenty seconds. A further rinse with deionized water was effected and the surface of the disc then subjected to a neutralization step by immersing the disc in a bath containing four ounces of sodium bicarbonate per gallon of water at a temperature of 70° F. (21° C.) for thirty seconds. The neutralized disc was then rinsed with the deionized water and immersed in a nickel-phosphorus electroless plating bath maintained at a temperature of 190° F. (88° C.) and a pH of 4.6. This nickel-phosphorus electroless bath included a source of nickel ions, a hypophosphite reducing agent, and a diboron ester of glucoheptonic acid The disc was maintained in that plating bath until a nickel-phosphorus layer of 800 micro-inches was deposited thereon which nickel-phosphorus electroless layer had a nickel content of approximately 90 percent and a phosphorus content of approximately 10 percent. The disc was then polished to provide a non-magnetic, nickel-phosphorus layer of approximately 400 micro-inches, rinsed with deionized water, cleaned with a mild alkaline cleaner, again rinsed with deionized water. The nickel-phosphorus layer was then activated by immersing the disc in a 20 percent solution of hydrochloric acid, rinsed with the deionized water, immersed in a 5 percent solution of sulfuric acid, and then rinsed again with deionized water. The disc was then placed in a cobalt bath having the following composition:

| Cobalt Sulfate (heptahydrate) | 10.0 gm/L |
|---|---|
| Sodium Hypophosphite | 10.0 gm/L |
| Sodium Tetraborate (decahydrate) | 30.0 gm/L |
| Sodium Citrate | 90.0 gm/L |
| Glycine | 25.0 gm/L |

The pH of this bath was adjusted with potassium hydroxide to 9.8 at the bath temperature of 176° F. (80° C.) The disc was then placed in the bath and continuously rotated therein for a total of 100 seconds, resulting in a cobalt-phosphorus layer having a thickness of three micro-inches. The disc was then removed, rinsed in deionized water and dried. The coercivity of the thus plated disc was 450 oersteds and it exhibited excellent remanent magnetization and hysteresis loop squareness.

EXAMPLE II

A disc was prepared in a manner identical with Example I up to the point of the cobalt plating. The thus prepared disc was then introduced into a cobalt plating bath having the following composition:

| Cobalt Sulphate (heptahydrate) | 6.0 gm/L |
|---|---|
| Sodium Hypophosphite | 10.0 gm/L |
| Sodium Tetraborate (decahydrate) | 20.0 gm/L |
| Sodium Citrate | 60.0 gm/L |
| Glycine | 15.0 gm/L |
| Diethanolamine | 5.0 gm/L |

The pH level of the bath was adjusted with potassium hydroxide to 9.7 and the bath maintained a temperature of 170° F. (77° C.). The disc was then placed in the bath and continuously rotated for three minutes resulting in a three micro-inch cobalt-phsophorus layer. The thus plated disc was then removed from the bath, rinsed and dried. The coercivity of the disk was 605 oersteds and it exhibited excellent magnetic remanence and hysteresis loop squareness.

EXAMPLE III

A disc was prepared in a manner identical with Example I up to the point of the cobalt plating. The thus prepared disc was then immersed in a cobalt bath having the following composition:

| Cobalt Sulphate (heptahydrate) | 7.0 gm/L |
|---|---|
| Sodium Hypophosphite | 12.0 gm/L |
| Sodium Tetraborate (decahydrate) | 20.0 gm/L |
| Sodium Citrate | 90.0 gm/L |
| Glycine | 20.0 gm/L |
| Diethanolamine | 5.0 gm/L |

The pH of the bath was adjusted with potassium hydroxide to 10.0 the temperature of 158° F. (70° C.) The disc was then placed in the bath and continuously rotated for three minutes, resulting in a cobalt-phosphorus electrolessly deposited layer thereon having a thickness of three micro-inches. The disc was then removed from the bath, rinsed and dried. This disc had a coercivity of 800 oersteds and likewise exhibited high magnetic remanence and excellent hysteresis loop squareness.

EXAMPLE IV

A disc was prepared in a manner identical with Example I and introduced into a cobalt plating bath identical to that set forth above in Example II except that 15.0 grams per liter of threonine was substituted for the 15.0 grams per liter of glycine. The operating conditions and steps were then performed in the same manner as to that set forth in Example II and the resultant disc, when tested displayed a coercivity of 737 oersteds as well as high magnetic remanence and excellent hysteresis loop squareness.

EXAMPLE V

The disc was prepared in the manner identical with Example I and introduced into a cobalt plating bath identical to that set forth above in Example II except that 15.0 grams per liter of serine was substituted for the 15.0 grams per liter of glycine. The operating conditions and steps were then performed in the same manner as to that set forth in Example II and the resultant disc, when tested displayed a coercivity of 669 oersteds as well as high magnetic remanence and excellent hysteresis loop squareness.

EXAMPLE VI

A disc was prepared in the manner identical with Example I and introduced into a cobalt plating bath identical to that set forth above in Example II except that 15.0 grams per liter of alpha alanine was substituted for the 15.0 grams per liter of glycine. The operating conditions and steps were then performed in the same manner as to that set forth in Example II and the resultant disc, when tested displayed a coercivity of 303 oersteds as well as high magnetic remanence and excellent hysteresis loop squareness.

EXAMPLE VII

A disc was prepared in the manner identical with Example I and introduced into a cobalt plating bath identical to that set forth above in Example II except that 15.0 grams per liter of valine was substituted for the 15.0 grams per liter of glycine. The operating conditions and steps were then performed in the same manner as to that set forth in Example II and the resulent disc, when tested displayed a coercivity of 707 oersteds as well as high magnetic remanence and excellent hysteresis loop squareness.

EXAMPLE VIII

A disc was prepared in the manner identical with Example I and introduced into a cobalt plating bath identical to that set forth above in Example II except that 15.0 grams per liter of monosodium glutamate was substituted for the 15.0 grams per liter of glycine. The operating conditions and steps were then performed in the same manner as to that set forth in Example II and the resultant disc, when tested displayed a coercivity of 631 oersteds as well as high magnetic remanence and excellent hysteresis loop squareness.

EXAMPLE IX

A 5086 aluminum alloy disc as described in Example I was similarily cleaned, degreased, and rinsed in deionized water. The rinsed disc was then immersed in 10 percent by volume solution of phosphoric acid at 80° F. (27° C.) for thirty seconds, then given a final rinse in deionized water. The freshly rinsed disc was immediately placed in a nickel phosphorus electroless plating bath as described in Example I and plated to a thickness of 800 micro-inches, rinsed in deionized water and dried. It was then polished to the desired surface finish. The polish nickel-phosphorus alloy plated disc was subsequently rinsed with distilled water, activated as explained in Example I, and plated in the electroless cobalt solution of composition as in Example III, at 160° F. (71° C.), continuously rotated, for a period of three minutes. The final electroless cobalt-phosphorus thickness was 3 micro-inches. The rinsed and dried disc has a coercivity of 790 oersteds. Magnetic remanence was high and hysteresis loop squareness was excellent.

EXAMPLE X

A disc was prepared in the manner identical with that set forth in Example I and introduced into a cobalt plating bath identical to that set forth in Example I except that no borate compound was added to the bath. The operating conditions and steps were than preformed in the same manner as that set forth in Example I, and the resultant disc, when tested, displayed a coercivity of only 300 oersteds, and a hysteresis loop squareness of 0.67.

EXAMPLE XI

An eight inch square of Mylar plastic 0.003 inches in thickness was cleaned in a mild alkaline cleaner at 150° F. (65° C.) for three minutes, rinsed in flowing deionized water and etched by immersion in concentrated chromic acid solution at 180° F. (88° C.) for sixty seconds. The etched Mylar was then rinsed in flowing deionized water at room temperature to remove excess chromic acid. After rinsing, the Mylar was immersed at 160° F. (71° C.) for sixty seconds in 3N sodium hydroxide solution to remove any residual traces of hexavalent chromium, followed by rinsing in deionized water to remove the sodium hydroxide. After rinsing, the Mylar sheet was sensitized in a commercial stannous ion sensitizing solution for thirty seconds, rinsed in deionized water, immersed in a palladium ion catalyst solution, all at room temperature, then given a final deionized water rinse prior to immersion in an electroless nickel-phosphorus plating bath identical to that described in Example I. Immersion time in the electroless nickel bath was three minutes at 188° F. (87° C.). The plated plastic sheet was rinsed in deionized water at room temperature upon removal from the electroless nickel bath, then immersed for three minutes in an electroless cobalt-phosphorus plating solution identical in composition and operating conditions to Example III. The plated plastic sheet was then removed from the bath, rinsed and dried. A disc prepared from this plated Mylar sheet had a coercivity of 800 oersteds and likewise exhibited high magnetic remanence and excellent hysteresis loop squareness.

EXAMPLE XII

A 5086 aluminum alloy disc was subjected to pretreatment and electroless nickel plating to identical Example I, except no post-plating surface finishing was given to the nickel-phosphorus deposit prior to depositing the electroless cobalt-phosphorus alloy. Instead, immediately after plating the electroless nickel-phosphorus the disc was removed from the bath, rinsed in deionized water, and placed in the electroless cobalt bath identical to that described in Example I. Plating time and conditions were identical. Final thickness of the cobalt-phosphorus layer was three micro-inches. The coercivity of the thus plated disc was 430 oersteds after rinsing and drying. It exhibited excellent remanent magnetization and hysteresis loop squareness.

While the foregoing specification sets forth various embodiments of the present invention in detail, it will be appreciated that modifications thereto may be made without departing from the spirit and scope thereof. Accordingly, only such limitations are to be imposed on this invention as are indicated in the appended claims.

We claim:

1. A process for producing a high magnetic storage device having improved magnetic recording properties, said process comprising the steps of:
   cleaning the surface of a substrate for said device to provide a substantially oil and oxide free substrate surface;
   electrolessly depositing a non-magnetic nickel-phosphorus layer on said device; and,
   electrolessly depositing a magnetic cobalt-phosphorus layer consisting essentially of cobalt and phosphorus on said nickel-phosphorus layer, said electroless cobalt-phosphorus deposition being conducted in an ammonia-free bath containing a source of cobalt ions, a source of hypophosphite ions, and a complexor constituent which includes, conjointly, an effective amount of each of a source of citrate ions and a low molecular weight, bath soluble amino acid.

2. The process of claim 1 which includes zincating said substantially oil and oxide free substrate surface to deposit a thin layer of metallic zinc thereon prior to electrolessly depositing said non-magnetic nickel-phosphorus layer.

3. The process of claim 1 wherein said cobaltphosphorus bath includes a buffering agent.

4. The process of claim 3 wherein said buffering agent is a borate.

5. The process of claim 3 wherein said buffering agent is selected from the group boric acid, carboxylic acids, and the alkali metal, tetraborates, metaborates and pentaborates.

6. The process of claim 3 wherein said buffering agent is alkali metal tetraborate.

7. The process of claim 1 wherein said low molecular weight, bath soluble amino acid includes from two to five carbon atoms.

8. The process of claim 7 wherein said low molecular weight, bath soluble amino acid is an alpha-amino acid.

9. The process of claim 7 wherein said low molecular weight, bath soluble amino acid is selected from the group alpha-alanine, glycine, monosodium glutamate, serine, threonine and valine.

10. The process of claim 1 wherein said cobalt-phosphorus electroless plating bath is maintained at a pH of from approximately 8 to 10.5.

11. The process of claim 1 wherein said cobalt-phosphorus bath is maintained at a pH of from approximately 9.6 to 10.0.

12. The process of claim 1 wherein said electroless nickel-phosphorus deposition is performed in a bath which includes an ester complex of glucoheptonic acid.

13. The process of claim 12 wherein said ester complex of glucoheptonic acid is selected from the group consisting of the diboron, tungsten and molybdenum esters of glucoheptonic acid.

14. The process of claim 12 wherein said nickel-phosphorus bath is maintained at a pH of from approximately 4.1 to 4.9.

15. The process of claim 1 wherein said nickel-phosphorus plated substrate is mechanically polished, cleaned to remove any oxides present thereon and activated prior to the electroless deposition of the cobalt-phosphorus layer.

16. A process for producing a high density magnetic storage rigid disc having improved magnetic recording properties, said process comprising the steps of:
cleaning the surface of an aluminum substrate disc for said disc to remove any oils and oxides which are present thereon;
electrolessly depositing a non-magnetic, nickel-phosphorus layer on said disc, said nickel-phosphorus layer being substantially free of any surface imperfections; and
electrolessly depositing a magnetic cobalt-phosphorus layer consisting essentially of cobalt and phosphorus on said nickel-phosphorus layer, said electroless cobalt-phosphorus deposition being conducted in an ammonia-free bath containing a source of cobalt ions, a source of hypophosphite ions, a borate buffering agent, and a complexor constituent which includes, conjointly, an effective amount of each of a source of citrate ions and a low molecular weight, bath soluble amino acid.

17. The process of claim 17 which includes zincating said cleaned aluminum substrate disc surface to apply a thin layer of metallic zinc thereon prior to electrolessly depositing said non-magnetic, nickel-phosphorus layer.

18. The process of claim 16 wherein said buffering agent is selected from the group boric acid, carboxylic acids, and the alkali metal tetraborate, metaborates and pentaborates.

19. The process of claim 16 wherein said low molecular weight, bath soluble amino acid includes from two to five carbon atoms.

20. The process of claim 16 wherein said low molecular weight, bath soluble amino acid is an alpha-amino acid.

21. The process of claim 16 wherein said low molecular weight, bath soluble amino acid is selected from the group alpha-alanine, glycine, monosodium glutamate, serine, threonine and valine 22. The process of claim 16 wherein said cobalt-phosphorus electroless plating bath is maintained at a pH of from approximately 8 to 10.5.

23. The process of claim 16 wherein said cobalt-phosphorus bath is maintained at a pH of from approximately 9.4 to 9.6.

24. The process of claim 16 wherein said non-magnetic, nickel-phosphorus layer is deposited on the surface of said zinc layer in a bath which includes an ester complex of glucoheptonic ester.

25. The process of claim 16 wherein said nickel-phosphorus bath is maintained at a pH of from approximately 4.1 to 4.9.

26. The process of claim 16 wherein said nickel-phosphorus plated substrate is mechanically polished, cleaned to remove any oxides present thereon, and activated prior to the electroless deposition of the cobalt-phosphorus layer.

27. The process of claim 26 wherein said nickel-phosphorus layer is polished to a thickness of from approximately 0.1 to 2.0 mils and then activated by contact with an acid solution prior to the electroless deposition of cobalt-phosphorus.

28. The process of claim 26 wherein said nickel-phosphorus layer is polished to a thickness of from 0.3 to 0.5 mils and then activated by contact with an acid solution prior to the electroless deposition of cobalt-phosphorus.

29. The process of claim 16 wherein a lubricant-protective overcoating is applied to said cobalt-phosphorus layer.

30. A process for producing a high density magnetic storage device having improved magnetic recording properties, said process comprising the steps of:
cleaning the surface of a substrate for said device to provide a substantially oil and oxide free substrate surface;
zincating said cleaned substrate surface to apply a thin layer of metallic zinc thereon;
electrolessly depositing a non-magnetic nickel-phosphorus layer on said zinc layer, said nickel-phosphorus layer being free of surface imperfections, and,
electrolessly depositing a magnetic cobalt-phosphorus layer consisting essentially of coblat and phosphorus on said nickel-phosphorus layer, said electroless cobalt-phosphorus deposition being conducted in a ammonia-free bath containing a source of cobalt ions, a source of hypophosphite ions, and a complexor constituent which includes, conjointly, an effective amount of each of a source of citrate ions and a low molecular weight, bath soluble amino acid.

31. The process of claim 30 wherein cobalt-phosphorus bath includes a buffering agent.

32. The process of claim 31 wherein said buffering agent is a borate.

33. The process of claim 31 wherein said buffering agent is selected from the group boric acid, carboxylic acids, and the alkali metal, tetraborates, metaborates and pentaborates.

34. The process of claim 31 wherein said buffering agent is alkali metal tetraborate.

35. The process of claim 30 wherein said low molecular weight, bath soluble amino acid includes from two to five carbon atoms.

36. The process of claim 35 wherein said low molecular weight, bath soluble amino acid is an alpha-amino acid.

37. The process of claim 35 wherein said low molecular weight, bath soluble amino acid is selected from the group alpha-alanine, glycine, monosodium glutamate, serine, threonine and valine.

38. The process of claim 30 wherein said cobalt-phosphorus electroless plating bath is maintained at a pH of from approximately 8 to 10.5.

39. The process of claim 30 wherein said cobalt-phosphorus bath is maintained at a pH of from approximately 9.6 to 10.0.

40. The process of claim 30 wherein said electroless nickel-phosphorus deposition is performed in a bath which includes an ester complex of glucoheptonic acid.

41. The process of claim 40 wherein said ester complex of glucoheptonic acid is selected from the group consisting of the diboron, tungsten and molybdenum esters of glucoheptonic acid.

42. The process of claim 41 wherein said nickel-phosphorus bath is maintained at a pH of from approximately 4.1 to 4.9.

43. The process of claim 30 wherein said nickel-phosphorus plated substrate is mechanically polished, cleaned to remove any oxides present thereon and activated prior to the electroless deposition of the cobalt-phosphorus layer.

44. A process for producing a high density magnetic storage rigid disc having improved magnetic recording properties which include high coercivity, high remanence and improved hysteresis loop squareness, said method comprising the steps of:

cleaning the surface of an aluminum substrate disc to provde a substantially oil and oxide free substrate surface thereon;

zincating said cleaned substrate surface to apply a thin layer of metallic zinc thereon;

electrolessly depositing a non-magnetic, nickel-phosphorus layer on said zinc layer, said nickel-phosphorus layer having a thickness of from approximately 0.1 to 2.0 mil, said nickel-phosphorus layer being substantially free of surface imperfections and having been deposited on said zinc surface in a nickel-phosphorus bath which is maintained at a pH of from approximately 4.1 to 4.9;

mechanically polishing said nickel-phosphorus coating to provide a substantially uniform overall thickness thereof of from approximately 0.1 to 2.0 mil;

cleaning said nickel-phosphorus layer to remove any oxides and other contaminants on the surface thereof;

acitvating said nickel-phosphorus layer to provide its improved receptiveness to a subsequent cobalt-phosphorus electroless deposit; and electrolessly depositing a magnetic cobalt-phosphorus layer consisting essentially of cobalt and phosphorus on said nickel-phosphorus layer, said electroless cobalt-phosphorus deposition being conducted in an ammonia-free bath which contains a source of cobalt ions, a source of hypophosphite ions, a borate buffering agent, and a complexor consitutent which includes, conjointly, an effective amount of each of a source of citrate ions and a low molecular weight, bath soluble amino acid having from two to five carbon atoms, said cobalt-phosphorus deposition being conducted in a bath which is maintained at a pH of from approximately 8.0 to 10.5; and subsequently applying a lubricant-protective overlayer on said cobalt-phosphorus layer.

45. The process of claim 44 wherein said cobalt-phosphorus bath is maintained at a pH of from approximately 9.4 to 10.0.

46. The process of claim 44 wherein said electroless nickel-phosphorus deposition is performed in a bath which includes an ester complex of a glucoheptonic acid.

47. The process of claim 46 wherein said ester complex of glucoheptonic ester is selected from the group consisting of the diboron, tungsten and molybdenum esters of glucoheptonic acid.

48. The process of claim 44 wherein said electroless nickel-phosphorus bath includes an unsaturated carboxylic acid of the formula $R(COOH)_n$ or a bath soluble derivative thereof, wherein R is an unsaturated alkyl chain having at least 2 carbon atoms, and wherein n is at least one, said bath also being substantially free of any sulphur constituent and having an oxidation state lower than the highest oxidation state of sulphur.

49. A high density magnetic storage device made in accordance with the process of claim 1.

* * * * *